May 10, 1927.
S. W. DUDLEY ET AL
1,628,312
BRAKE APPLYING APPARATUS
Filed May 11, 1925
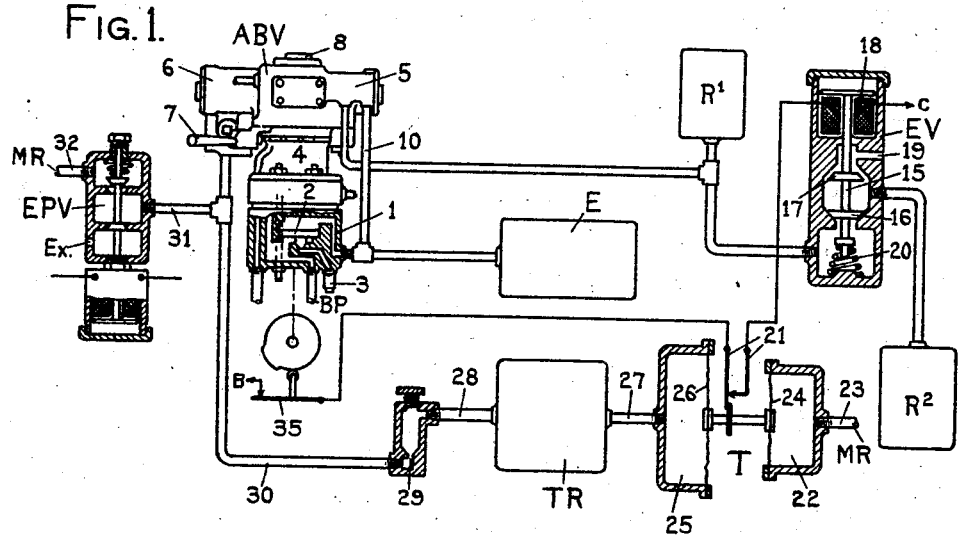
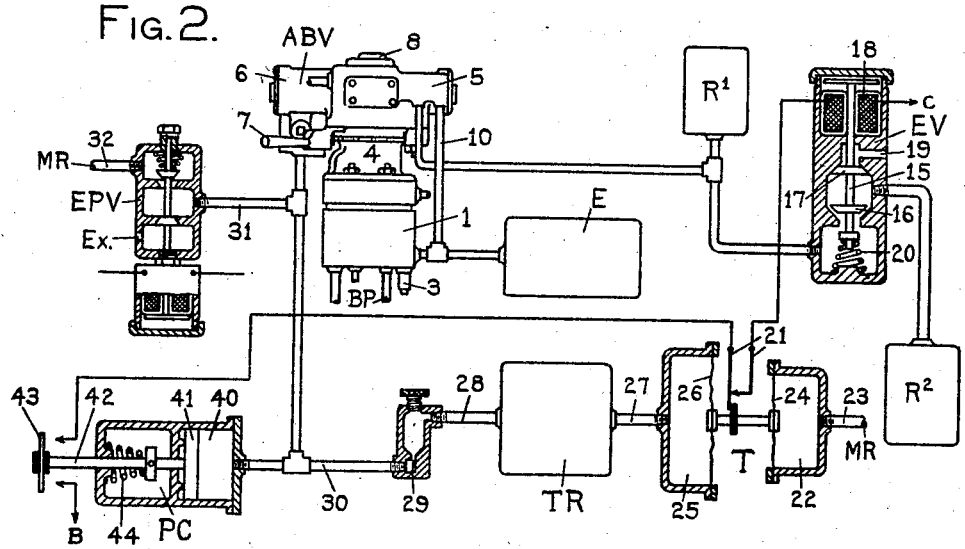
Inventors
S. W. Dudley,
C. S. Bushnell,
Neil D. Preston,
their Attorney Patented May 10, 1927.

1,628,312

UNITED STATES PATENT OFFICE.

SAMUEL W. DUDLEY, OF NEW HAVEN, CONNECTICUT, AND CHARLES S. BUSHNELL, OF ROCHESTER, NEW YORK, ASSIGNORS TO GENERAL RAILWAY SIGNAL COMPANY, OF ROCHESTER, NEW YORK.

BRAKE-APPLYING APPARATUS.

Application filed May 11, 1925. Serial No. 29,430.

This invention relates to braking systems for railway trains, and more particularly to manually operable brake applying apparatus which may be automatically operated and if so operated effects a two-stage brake application.

In applying automatic train control to railway systems and in order not to bring an additional hazard upon the train as a result of a brake application effective automatically, as is the case if an automatic brake application is effected too quickly, which may result in a wreck by reason of buckling of the train, or the like, mechanism for effecting a less severe brake application is desirable. The engineer when applying the brakes manually, especially on long freight trains, makes a very light brake application to take up the slack between cars after which he follows this up with a heavy brake application intended to bring the train to a stop quickly. In providing automatic apparatus for applying the brakes it is desired to have this apparatus simulate a manual application as near as is practicable with such automatic apparatus.

In accordance with the present invention it is proposed to provide means whereby the automatic apparatus, which is to be applied to a braking system of the type in which the brake pipe is normally charged and in which the venting of the brake pipe effects a brake application, is constructed so that a light or preliminary reduction in equalizing reservoir pressure of seven or eight pounds is first made and in which after the expiration of a time interval, a further reduction is effected, so that, the total reduction is that necessary to effect a full service brake application. In constructing mechanism of this kind it is rather difficult to determine the period of time which should elapse between the first and second reduction, especially bearing in mind that the equivalent is at times to be used for short or light trains and at other times for long or loaded trains; also, under some conditions it will be desirable to even start the second venting of the equalizing reservoir before the brake pipe pressure has been reduced to that of the equalizing reservoir pressure due to the first reduction in equalizing reservoir pressure, and still obtain a brake application different from that of a single stage or full service brake application. This difference between an overlapped two-stage brake application and a single stage brake application of the same ultimate brake applying pressure reduction is believed to be due to the fact that the equalizing discharge piston valve contained in the usual H⁶ Westinghouse engineer's brake valve (which may be assumed to be the one employed in applying the present invention) effects a tapering discharge of fluid pressure from the brake pipe upon a reduction in equalizing reservoir pressure, that is, this equalizing discharge piston valve does not open up widely and stay open until brake pipe pressure has dropped to equalizing reservoir pressure but opens widely and gradually closes up so that the discharge of fluid pressure from the brake pipe is not dependent on pressure alone but is dependent on the pressure existing in the brake pipe and the position of this equalizing discharge piston valve.

More specifically, it is proposed in accordance with the present invention to provide two reduction reservoirs into which the equalizing reservoir may discharge upon an automatic application of the brakes effected by operating the engineer's brake valve itself, timing means being provided which maintains these two reduction reservoirs isolated until an interval of time after the automatic brake application is begun, this timing means being controlled directly by an electro-pneumatic valve which also controls the automatically operated engineer's brake valve.

Other objects, purposes and characteristic features of the present invention will be apparent from the following detailed description.

In describing the invention in detail reference will be made to the accompanying drawings, in which:—

Fig. 1 shows brake applying apparatus embodying the present invention for effecting a two-stage brake application in which suitable timing means is initiated directly by an electro-pneumatic valve which controls the brake applying apparatus, and in which the time between the two stages may be shortened by the pneumatic valve which controls the brake applying apparatus and in which the time between the two stages may be shortened by the engineer at will; and Fig. 2 shows a modified arrangement of the system shown in Fig. 1 in which the engineer cannot interfere with the time intervening between the two stages.

The automatic brake valve ABV shown conventionally comprises the main casing 1 of the usual engineer's brake valve, which may be assumed to be the well known Westinghouse H⁶ engineer's brake valve, and which contains the usual equalizing discharge piston valve 2, which valve causes brake pipe pressure to be discharged from the brake pipe BP through the valve port of valve 2 and the service exhaust fitting 3 when the pressure in the brake pipe BP is higher than that in the equalizing reservoir E. This engineer's brake valve has its usual cap removed therefrom and is provided with a special cap 4 upon which is super-imposed a brake valve actuator including a small cylinder 5 normally connected to main reservoir pressure supplied through the electro-pneumatic valve EPV from the main reservoir MR. This large cylinder is vented to atmosphere through the exhaust port Ex of the device EPV when this device is in its de-energized position. The cylinders 5 and 6 contain pistons connected together by a rack which rack is adapted to operate the rotary valve in the engineer's brake valve when pressure is vented from the large cylinder 6, this mechanism being so constructed that the engineer's brake valve handle 7 is disconnected from the rotary valve itself when the valve is automatically operated, so that the engineer cannot oppose operation of the valve or annul such operation by re-charging the brake pipe after the brake valve is operated. This automatic brake valve ABV also includes a supplemental rotary valve (not specifically shown), which is contained under the cap 8 and is mechanically connected to the main rotary valve in the engineer's brake valve so as to move with it. This supplemental valve is connected to the equalizing reservoir E through the pipe 10 and has ports and cavities therein for connecting this equalizing reservoir E to the reduction reservoir R¹ when the engineer's brake valve is in the service or energizing position, and for isolating this equalizing reservoir E from the reduction reservoir R¹ and connecting the reduction reservoir R¹ to atmosphere when the valve ABV is in the lap, holding, running, or release position. In this connection it is desired to be pointed out that the usual engineer's brake valve itself has been slightly modified to adapt it to the present invention by having its service exhaust port, which port is contained in the seat of the usual rotary valve and which leads to the equalizing reservoir, plugged up so that the equalizing reservoir is not vented to atmosphere when the engineer's brake valve is in the service position; that is, the equalizing reservoir E can only discharge through the supplemental valve contained under the cap 8 when the engineer's brake valve is in the service position and then can not be vented to atmosphere directly but can only vent to the reduction reservoir R¹. For a further and more detailed description of this automatic engineer's brake valve ABV, attention is directed to the prior application of Charles S. Bushnell, Serial No. 16,937, filed March 20, 1925.

In order to at times connect the reduction reservoirs R¹ and R² together and at other times isolate them from each other and vent the reduction reservoir R² to atmosphere, an electrically operated valve EV is employed. This electrically operated valve includes a valve stem 15 having tappet valves 16 and 17 connected thereto, which valves 16 and 17 are adapted to rest against their respective seats when the winding 18 of the valve EV is energized and de-energized respectively. It will be noted that the reservoirs R¹ and R² are isolated from each other when the valve EV is energized and that the reduction reservoir R² is connected to atmosphere through the port 19 under this condition, and that the two reservoirs R¹ and R² are connected together when the valve EV is de-energized, the spring 20 being employed to move the stem 15 upwardly upon de-energization of the winding 18.

The present invention employs a timing device T, which device derives its operating energy from main reservoir pressure existing in the reservoir MR, not specifically shown. This timing device T is constructed so that the contacts 21 forming part thereof open substantially a definite period of time after the timing device T is initiated irrespective of variation in main reservoir pressure. This timing or time element device T comprises a small chamber 22 normally connected by the pipe 23 to main reservoir pressure having a diaphragm 24 constituting one wall thereof, and a large chamber 25 including a large diaphragm 26 which large chamber is connected to the timing reservoir TR, by the pipe 27. The timing reservoir TR under normal energized condition of the device EPV, is connected to main reservoir pressure through the pipe 28, restricted passage or orifice 29, pipes 30 and 31 through the device EPV and pipe 32. If now, the device EPV is de-energized the large cylinder 6 of the brake valve actuator and the timing reservoir TR are connected to atmosphere through the exhaust port Ex of the device EPV, the large cylinder 6 is immediately vented and the timing reservoir TR is gradually vented through the restricted orifice 29, so that contacts 21 are opened when the pressure in the timing reservoir TR has fallen to a value so that the force exerted on the large diaphragm 26 no longer exceeds that of the force exerted upon the small diaphragm 24. In actual practice it has been found that the timing device T opens its contacts 21 a substantial definite period of time after the timing reservoir is opened to atmosphere through the restricted opening 29 irrespective of the ordinary variations in main reservoir pressure, so that this timing device is accurate even though main reservoir pressure varies considerably.

Under normal conditions of the apparatus shown, that is, with the engineer's brake valve handle in the running position, with the device EPV energized and with main reservoir pressure existing, the usual rotary valve and the supplemental valve assume the running position; further the electrically operated valve EV is also energized through a circuit readily traced in the drawings which includes the contact 35 contained in practice in the actuator casing of the device ABV. This contact 35 is only open during the lap and service position of the engineer's brake valve handle 7 and is not opened if the rotary valve is operated automatically by the brake valve actuator.

*Manual operation (Fig. 1).*—Let us assume that the engineer wishes to apply the brakes manually with the brake applying apparatus shown in Fig. 1, and in order to do so moves the brake valve handle 7 to the service position and leaves it there until equalizing reservoir pressure has been reduced say from 8 to 10 pounds, which is considered a sufficient reduction to bunch the slack between cars and that he thereafter returns the handle 7 to the lap position. During all this time that the handle 7 was in the service and so long as it is not returned beyond the lap position the contact 35 is separated from the stationary contact illustrated by an arrow and the device EV is de-energized. Also, with the handle 7 returned to the lap position the reservoirs $R^2$ and $R^1$ are permitted to vent to atmosphere through the supplemental valve for reasons heretofore given. This of course effects a reduction in brake pipe pressure for reasons heretofore given and results in a light brake application. Let us further assume that the engineer is now ready to make a further reduction to complete the necessary reduction to make a full service brake application and that he moves the handle 7 to the service position and leaves it there until a full service reduction, of say twenty pounds, from the original pressure, has been made, after which he returns the handle to the lap position.

With this further reduction in equalizing reservoir pressure the equalizing discharge piston valve 2 vents the brake pipe until its pressure has fallen to the pressure existing in the equalizing reservoir E. The net result is, that a manual application made by the apparatus shown is substantially the same as that of the usual air brake system only that the equalizing reservoir is vented into the reduction reservoirs $R^1$ and $R^2$ instead of being vented directly to atmosphere. In this connection, it should be noted that if the engineer wishes to make a full service brake application in one stage he may move his brake valve handle 7 to the service position and leave it there, and in so doing he will effect a full service brake application without waste of air because the volume of the reservoirs $R^1$ and $R^2$ is such that if equalizing reservoir is vented to these two reduction reservoirs the equalized pressure is that necessary to effect a full service brake application. Further, it should be noted that the timing device T need not be considered during a manual application because the circuit controlled by this timing device T is open so long as a manual application is initiated and maintained.

*Automatic operation (Fig. 1).*—Let us now assume that an automatic brake application is to be imposed possibly because the train is entering a caution block, is approaching a drawbridge or other hazardous territory, or that an automatic brake application is desired because the engineer is not vigilant and is not attending to his duties, or at least has not manifested such vigilance and that for any one of these reasons the device EPV is de-energized by suitable train control mechanism. De-energization of the device EPV causes main reservoir pressure to be immediately vented from the large cylinder 6 thereby causing the force acting on the piston in the small cylinder 5 to predominate and operates the engineer's brake valve to the service position, and simultaneously with such operation causes the unlatching means in the actuator to unlatch the brake valve handle 7 from the usual rotary valve. The movement of the device EPV to its de-energized position also vents the timing reservoir TR but by reason of the restricted orifice 29, the timing reservoir TR is very gradually vented and only opens contacts 21 after the expiration of a period of time. Movement of the supplemental valve and the rotary in the engineer's brake valve to the service position causes the equalizing reservoir E to be connected to the first reduction reservoir R¹ through a port of the proper size to effect the proper gradual reduction in the equalizing reservoir E. The ratio of volumes of the reservoirs E and R¹ is such that if the reservoir R¹, which is normally connected to atmosphere, is allowed to equalize with the pressure in the reservoir E that a reduction of seven or eight pounds in equalizing reservoir pressure takes place, which is considered to be the proper reduction for effecting the first stage application in a two-stage brake application. With this reduction in equalizing reservoir pressure the brake pipe is vented through the usual equalizing discharge piston valve until brake pipe pressure has also fallen to the same extent.

At about this time, or possibly a little earlier or a little later, the contacts 21 of the timing device T are opened. This opening of contacts 21 breaks the energizing circuit for the electrically operated valve EV, so that this valve quickly moves to its raised or de-energized position thereby quickly connecting the reduction reservoirs R¹ and R² together without the escape of air to atmosphere, after which a new equalization of pressures takes place between the reservoirs E, R¹ and R², the volume of the reduction reservoirs R² being such that the new equalized pressure between these three reservoirs, is such as to effect a full service brake application. With the equalizing reservoir E reduced to this new pressure value the brake pipe is again vented through the medium of the equalizing discharge piston valve 2, so that the second stage of the brake application is consummated.

The apparatus shown in Fig. 1, thus provides means whereby the engineer may make a full service brake application without the waste of air, by merely moving the brake valve to the service position, and which allows him to make a multi-stage brake application by operating the handle 7 in the usual manner and which also permits him to shorten the time intervening between the two stages of an automatic brake application, by merely moving his handle to the lap position and in so doing retract contact 35 and effect de-energization of the electrically operated valve EV whereby the two reduction reservoirs are connected together.

*Structure (Fig. 2).*—In the arrangement shown in Fig. 2 the electrically operated valve EV, the device EPV, the time element device T, the reservoirs E, R¹ and R², and the timing reservoir TR are the same as shown in the braking system illustrated in Fig. 1 and therefore need not be described. The automatically operable engineer's brake valve ABV is the same as that shown in Fig. 1 except that it does not include the contact 35 operated by the engineer's brake valve handle 7, the modified construction shown in Fig. 2 having been provided to avoid any electrical wiring or presence of contacts and the like in connection with the engineer's brake valve.

Since in the arrangement shown in Fig. 2, manual operation of the engineer's brake valve can not effect de-energization of the electrically operated valve EV by reason of the omission of contact 35, the valve EV is preferably normally de-energized, so that manual operation of the engineer's brake valve to the service position effects a full service brake application because the reservoirs R¹ and R² are normally connected together. In order, however, to have reservoirs R¹ and R² isolated from each other, as soon as an automatic brake application is initiated, a pneumatically operated circuit controller PC is employed which closes the circuit for energizing the valve EV at one point immediately upon de-energization of the device EPV and before the brake valve actuator has actually moved the brake valve to the service position. This pneumatically operated circuit controller PC consists of a cylinder 40 having a piston 41 therein connected to a stem 42 carrying an insulated contact 43, which piston is normally held in the position shown by main reservoir pressure existing in cylinder 40 against the opposition of the compression spring 44. Obviously the release of pressure from cylinder 40 causes the spring 44 to operate the piston 41 and close the contact 43.

*Manual operation (Fig. 2).*—The manual operation of the apparatus shown in Fig. 2 is the same as that of the apparatus shown in Fig. 1 as far as functions are concerned. It should, however, be noted that in the arrangement shown in Fig. 2 the electrically operated valve EV is normally de-energized and continues to remain de-energized upon the manual application; whereas in the arrangement shown in Fig. 1 the electrically operated valve EV is normally energized but is de-energized as soon as the engineer's brake valve is moved to the lap or service position manually, also that both of these arrangements permit the engineer to make a manual brake application in substantially the same way.

*Automatic operation (Fig. 2).*—Let us assume that the device EPV is de-energized by suitable train control mechanism for any one of the various reasons heretofore mentioned. De-energization of the device EPV disconnects main reservoir pressure from the large cylinder 6, the timing reservoir TR and the cylinder 40 of the pneumatic circuit controller PC, and simultaneously with such removal of main reservoir pressure the cylinders 6 and 40 and the timing reservoir TR are connected to atmosphere. These various devices are so constructed that the circuit controller PC is first closed immediately after which the engineer's brake valve assumes the service position by reason of operation of the brake valve actuator. Closure of the contact 43 energizes the electro-pneumatic valve EV and isolates reservoirs R¹ and R² from each other. This causes the equalizing reservoir E to be vented into the reservoir R¹ by reason of operation of the brake valve and after equalization of pressures between these two reservoirs, a reduction of seven or eight pounds in equalizing reservoir pressure has been made. This reduction effects a similar reduction in brake pipe pressure for reasons heretofore given thus effecting a light brake application sufficient to bunch the slack between cars and placing the train in a condition to receive a full service brake application. By reason of the restricted orifice 29 a definite period of time must elapse before contacts 21 are opened. When this time has elapsed, contacts 21 open and the device EV is again de-energized thereby connecting the reduction reservoirs R¹ and R² together. With the equalizing reservoirs E now connected to both the reduction reservoirs R¹ and R², a new equalization of pressures results, which by reason of the volumes of the reservoir selected is such as to give a full service brake application.

It should be noted that the automatic operation of the system shown in Fig. 2 is the same as that shown in Fig. 1 except that initiation of an automatic operation in Fig. 2 energizes the electrically operated valve EV, whereas this valve is already energized in the system shown in Fig. 1. Further, it should be noted, that the engineer can not intervene as to the amount of time required before the second stage of brake application takes place automatically in the arrangement shown in Fig. 2 as is possible in the arrangement shown in Fig. 1. This, however, does not materially interfere with the engineer's free manipulation of the brakes when an automatic brake application has been started, because the time delay effected by the time element device T is very short, and further, if desired the engineer may make an emergency application if he finds this necessary.

Having thus shown and described several embodiments of a brake applying system which may be either operated manually or automatically and which if operated automatically effects a two-stage brake application with a limited reduction in brake pipe pressure and in which the engineer at all times is free to do what is necessary towards stopping a train, but in which he is not free to release the brakes until such release of the brakes is made possible by suitable automatic train control apparatus, which has not been specifically shown; it is desired to be understood that the specific apparatus shown has not been illustrated for the purpose of showing the scope of the invention or the exact construction preferably employed in practice, and that various changes, modifications and additions may be made to apply the brake control mechanism to the particular type of braking system in connection with which it is to be used, without departing from the scope of the invention or the idea of means underlying the same.

What is desired to be secured by Letters Patent is:—

1. Brake applying apparatus for trains employing a braking system of the type in which the brake pipe is normally charged and in which venting thereof effects a brake application; the combination of an equalizing reservoir, a brake pipe, an equalizing discharge piston valve connecting said equalizing reservoir and brake pipe for exhausting air from the brake pipe to atmosphere if brake pipe pressure is higher than equalizing reservoir pressure, and two reduction reservoirs normally connected together; a brake applying valve which may be controlled manually; automatically controlled pneumatic means for operating said valve to the brake applying position, said valve if operated to the brake applying position connecting said equalizing reservoir to one of the reduction reservoirs, thereby effecting a predetermined reduction in equalizing reservoir pressure; pneumatically controlled means connected to be operated when said first mentioned pneumatic means is operated for isolating said two reservoirs from each other; and means annulling the effect of said last mentioned means effective a predetermined time after said automatically controlled pneumatic means is operated, whereby said two reservoirs are again connected together and a second stage of reduction of equalizing reservoir pressure results.

2. Brake applying apparatus for trains employing a braking system of the type in which the brake pipe is normally charged and in which venting thereof effects a brake application; the combination of a main reservoir, an equalizing reservoir, and a first and a second reduction reservoir; an equalizing discharge piston valve connected between the brake pipe and the equalizing reservoir which discharges air from the brake pipe whenever brake pipe pressure is higher than equalizing reservoir pressure; an engineer's valve which if operated to the service position vents said equalizing reservoir into the first reduction reservoir; an actuator for operating said valve tending to cause said valve to assume a brake applying position including a cylinder normally connected to a source of air pressure, which cylinder acts to cause said actuator to assume a normal position in which the engineer's brake valve is not operated; means tending to assume a position to effect isolation of the first and second reduction reservoirs and including a cylinder normally connected to a source of pressure causing it to assume a position connecting said reservoirs; automatic means for simultaneously controlling said actuator and said first mentioned means by venting both of said cylinders, whereby the two reduction reservoirs are isolated from each other and said equalizing reservoir is connected to the first reduction reservoir; said first mentioned means being effective to isolate said two reduction reservoirs from each other for a predetermined interval of time only.

3. Brake applying apparatus for trains employing a braking system of the type in which the brake pipe is normally charged and in which venting thereof effects a brake application; the combination of a main reservoir, an equalizing reservoir, and a first and a second reduction reservoir; an equalizing discharge piston valve connected between the brake pipe and the equalizing reservoir which discharges air from the brake pipe whenever brake pipe pressure is higher than equalizing reservoir pressure; an engineer's brake valve which if operated to the service position vents said equalizing reservoir into the first reduction reservoir; an actuator for operating said valve tending to cause said valve to assume a brake applying position including a cylinder normally connected to a source of pressure so that the piston in said cylinder causes said automatic means to assume a normal position in which the engineer's brake valve is not operated; means tending to assume a position to effect isolation of the first and the second reduction reservoirs including a cylinder normally connected to a source of pressure causing it to assume a position connecting said reservoirs; automatic means for simultaneously controlling said actuator and said means by venting said cylinders, whereby the two reduction reservoirs are isolated from each other and said equalizing reservoir is connected to the first reduction reservoir; said first mentioned means including a time element device comprising, differential piston mechanism operated by air pressure derived from said main reservoir and effective to again connect said two reservoirs together after a predetermined interval of time irrespective of slight variations in main reservoir pressure.

4. Brake applying apparatus for trains employing a braking system of the type in which the brake pipe is normally charged and in which venting thereof effects a brake application; the combination of a main reservoir, an equalizing reservoir, and a first and a second reduction reservoir; an equalizing discharge piston valve connected between the brake pipe and the equalizing reservoir which discharges air from the brake pipe whenever brake pipe pressure is higher than equalizing reservoir pressure; an engineer's brake valve which if operated to the service position vents said equalizing reservoir into the first reduction reservoir; an actuator for operating said valve tending to cause said valve to assume a brake applying position including a cylinder normally connected to a source of pressure thereby causing said automatic means to assume the normal position in which the engineer's brake valve is not operated; means tending to assume a position to effect isolation of the first and second reduction reservoirs including a cylinder normally connected to a source of pressure causing it to assume a position connecting said reservoirs; automatic means for simultaneously controlling said actuator and said means by venting said cylinders, whereby the two reduction reservoirs are isolated from each other and said equalizing reservoir is connected to the first reduction reservoir; said first mentioned means including a time element device comprising a large and a small surface against which main reservoir pressure acts and from which pressure is vented from the large surface upon actuation of said automatic means, which is effective to again connect said two reservoirs together when the total pressure against each of these surfaces is the same, whereby the time during which the two reduction reservoirs are isolated is substantially the same irrespective of slight changes in main reservoir pressure.

5. Brake applying apparatus for trains employing a braking system of the type in which the brake pipe is normally charged and in which venting thereof effects a brake application; the combination of a main reservoir, an equalizing reservoir, and a first and a second reduction reservoir, an equalizing discharge piston valve connected between the brake pipe and the equalizing reservoir which discharges air from the brake pipe whenever brake pipe pressure is higher than equalizing reservoir pressure; an engineer's brake valve which if operated to the service position vents said equalizing reservoir into the first reduction reservoir; an actuator for operating said valve tending to cause said valve to assume a brake applying position including a cylinder normally connected to a source of pressure whereby the piston in said cylinder causes said automatic means to assume a normal position in which the engineer's brake valve is not operated; mechanism for isolating the first reduction reservoir from the second reduction reservoir when operated; a time element device for connecting the first reduction reservoir to the second reduction reservoir a predetermined period of time after it is initiated; and automatic means for simultaneously actuating said actuator, said mechanism and said time element device; whereby the equalizing reservoir is first vented into the first reduction reservoir and after a time is further vented by the equalization of pressures between the equalizing reservoir, the first reduction reservoir and the second reduction reservoir thereby effecting a two-stage automatic brake application.

6. A pneumatically operated time element device for automatic train control systems comprising, a pair of contacts, a timing reservoir, differential pneumatically operated means for opening said contacts when the pressure in said reservoir has dropped a predetermined per cent below its original value, and means for effecting such reduction including a restricted opening and means for venting said timing reservoir through said restricted opening, whereby the time required to open said contacts is substantially the same regardless of the original pressure existing in said timing reservoir.

7. Brake control apparatus for automatic train control systems of the type in which the brake pipe is normally charged and in which a reduction in brake pipe pressure effects a brake application, the combination with an equalizing reservoir, a brake pipe, an equalizing discharge piston valve for discharging pressure fluid from the brake pipe so long as brake pipe pressure is higher than equalizing reservoir pressure, two reduction reservoirs to one of which the equalizing reservoir is connected when an automatic brake application is to be effected, and means operated upon an automatic brake application for isolating said reduction reservoirs from each other for a period of time.

8. A pneumatically operated time element device for automatic train control systems comprising, a pair of contacts, a timing reservoir, a main reservoir, differential pneumatically operated means for operating said contacts including two opposing members one of which is of large area having the fluid pressure in said timing reservoir acting thereon and the other of which is of small area having main reservoir pressure acting thereon, means for normally charging said timing reservoir to the same pressure as that existing in said main reservoir, and means for venting said timing reservoir through a restricted orifice and operated when the time period is to be started, whereby said contacts are operated substantially a fixed interval of time after said venting is started regardless of the pressure existing in said main reservoir.

9. A pneumatically operated time element device for automatic train control systems comprising, a pair of contacts, a timing reservoir, a main reservoir, differential pneumatically operated means for operating said contacts including two opposing diaphragms of which one is of large area having the fluid pressure in said timing reservoir acting thereon and of which the other is of small area having main reservoir fluid pressure acting thereon, means normally charging said timing reservoir to the same pressure as that existing in said main reservoir, and means for venting said timing reservoir through a restricted orifice opened when the time period is to be started whereby said contacts are operated substantially a fixed time interval after said venting is started regardless of slight variations in the pressure existing in said main reservoir.

10. Brake applying apparatus for air brake systems of the type in which the brake pipe is normally charged and in which venting of the brake pipe effects a brake application, an automatic brake applying device maintained in its normal inactive condition by fluid pressure contained in a pipe which if rendered active effects a predetermined reduction in brake pipe pressure, an electrically operated valve for normally connecting said pipe to a source of fluid pressure and for venting fluid pressure from said pipe to atmosphere under adverse traffic conditions ahead, and supplemental brake applying means including a timing reservoir connected to said pipe through a restricted opening which effects further venting of the brake pipe a predetermined interval of time after said brake applying device is rendered active.

11. Brake applying apparatus for air brake systems of the type in which the brake pipe is normally charged and in which venting of the brake pipe effects a brake application, an automatic brake applying device maintained in its normal inactive condition by fluid pressure contained in a pipe, an electrically operated valve for normally connecting said pipe to a source of fluid pressure and for venting fluid pressure from said pipe to atmosphere under adverse traffic conditions ahead, and timing means including a timing reservoir connected to said pipe through a restricted opening.

12. Brake applying apparatus for air brake systems of the type in which the brake pipe is normally charged and in which venting of the brake pipe effects a brake application; and an automatic brake applying device maintained in its normal inactive condition by fluid pressure contained in a pipe which if rendered active effects a predetermined reduction in brake pipe pressure; an electrically operated valve for normally connecting said pipe to a source of fluid pressure and for venting fluid pressure from said pipe to atmosphere under adverse traffic conditions including; a supplemental brake applying means including a timing reservoir connected to said pipe through a restricted opening; a pneumatically operated contact mechanism connected to said pipe and rendered active when said pipe is vented; and supplemental brake applying means rendered active when said automatic brake applying device is operated, said contact mechanism is operated and said timing reservoir has been vented to a predetermined extent.

In testimony whereof we affix our signatures.

SAMUEL W. DUDLEY.
CHARLES S. BUSHNELL.